United States Patent
Yamauchi et al.

(10) Patent No.: US 8,470,398 B2
(45) Date of Patent: Jun. 25, 2013

(54) METHOD FOR PRODUCING SINGLE-HOLE HOLLOW POLYMER MICROPARTICLES

(75) Inventors: Hiroshi Yamauchi, Osaka (JP);
Yasuyuki Yamada, Osaka (JP)

(73) Assignee: Sekisui Chemical Co., Ltd., Osaka (JP)

(*) Notice: Subject to any disclaimer, the term of this patent is extended or adjusted under 35 U.S.C. 154(b) by 130 days.

(21) Appl. No.: 13/120,241

(22) PCT Filed: Sep. 17, 2009

(86) PCT No.: PCT/JP2009/066241
§ 371 (c)(1),
(2), (4) Date: May 20, 2011

(87) PCT Pub. No.: WO2010/035680
PCT Pub. Date: Apr. 1, 2010

(65) Prior Publication Data
US 2011/0223426 A1    Sep. 15, 2011

(30) Foreign Application Priority Data

Sep. 29, 2008 (JP) .................................. 2008-251052
Jan. 15, 2009 (JP) .................................. 2009-006362
Jul. 1, 2009 (JP) .................................. 2009-156995

(51) Int. Cl.
*B32B 5/16* (2006.01)

(52) U.S. Cl.
USPC .................. 427/212; 427/213.3; 428/403

(58) Field of Classification Search
USPC ................... 428/403; 427/212, 213.3
See application file for complete search history.

(56) References Cited

U.S. PATENT DOCUMENTS

2006/0093822 A1 * 5/2006 Hsu et al. ................ 428/402.2

FOREIGN PATENT DOCUMENTS

| EP | 0695769 | * | 2/1996 |
|---|---|---|---|
| JP | 62-127336 | | 6/1987 |
| JP | 4-279637 | | 10/1992 |
| JP | 4-68324 | | 11/1992 |
| JP | 5-125127 | | 5/1993 |
| JP | 2002-105104 | | 4/2002 |
| JP | 2005/232426 | | 9/2005 |
| JP | 2010/100799 | | 5/2010 |
| WO | WO2008/095256 | * | 8/2008 |
| WO | 2010/035680 | | 4/2010 |

OTHER PUBLICATIONS

Supplementary European Search Report dated Feb. 16, 2012 in EP Application No. 09816095.5.
International Search Report issued Dec. 15, 2009 in International (PCT) Application No. PCT/JP2009/066241.
International Search Report issued Aug. 31, 2010 in International (PCT) Application No. PCT/JP2010/062603.
Front Page of International Publication WO 2012/014279, with English abstract.

* cited by examiner

*Primary Examiner* — Leszek Kiliman
(74) *Attorney, Agent, or Firm* — Wenderoth, Lind & Ponack, L.L.P.

(57) ABSTRACT

The present invention provides a method for producing single-hole hollow polymer particles having extremely uniform outer diameters and inner diameters with no need for classification operation. Further, the present invention provides single-hole hollow polymer particles produced by the method for producing single-hole hollow polymer particles. The present invention provides a method for producing single-hole hollow polymer particles including the steps of preparing a dispersion of swollen particle droplets by mixing a seed particle dispersion obtained by dispersing seed particles containing a non-crosslinked polymer in a water-containing dispersion medium with an oil-soluble solvent and thereby making the seed particles absorb the oil-soluble solvent; preparing a mixed solution by mixing the dispersion of the swollen particle droplets with an aqueous solution containing a water-soluble polymer; and precipitating the water-soluble polymer on the surfaces of the swollen particle droplets by carrying out operation for lowering the solubility of the water-soluble polymer in the mixed solution.

5 Claims, No Drawings

METHOD FOR PRODUCING SINGLE-HOLE HOLLOW POLYMER MICROPARTICLES

This application is a U.S. national stage of International Application No. PCT/W2009/066241 filed Sep. 17, 2009.

TECHNICAL FIELD

The present invention relates to a method for producing single-hole hollow polymer particles having extremely uniform outer diameters and inner diameters with no need for classification operation. Further, the present invention relates to single-hole hollow polymer particles produced by the method for producing single-hole hollow polymer particles.

BACKGROUND ART

As a method for producing hollow polymer particles having single holes, there is a method involving preparing a monomer solution by evenly dissolving a hydrophilic monomer, a crosslinkable monomer, and an oil-soluble solvent together with a polymerization initiator, emulsifying and dispersing the monomer solution in an aqueous phase, and thereafter carrying out polymerization. This production method is a method for forming single holes in the particles based on the phase separation effect of the polymer to be produced and the oil-soluble solvent.

However, the hollow polymer particles having single holes which are obtained by this method have particle diameter distribution dependent on the mechanical operation method of the emulsification and dispersion. Therefore, there is a problem that control of the outer diameter (particle diameter), the inner diameter (diameter of the single hole), and the ratio of the outer diameter and the inner diameter within a certain range is difficult.

Even if classification operation is performed with sieves or meshes to make the outer diameters even, it is difficult to obtain hollow polymer particles with sufficiently even outer diameter distribution. Further, even if the outer diameters are made even, it is impossible to make the inner diameters even.

Furthermore, also known is a method for classification of obtained hollow polymer particles in a fluid dynamic manner based on a difference in specific gravity or the like. However, particles with a large outer diameter and a large inner diameter (high degree of hollowness) and particles with a small outer diameter and a small inner diameter (low degree of hollowness) have similar mobility, so that these particles cannot be classified by this method.

To deal with such a problem, a method for producing hollow polymer particles by making seed particles absorb monomer components and then carrying out polymerization has been investigated. It is supposed to be possible to produce hollow polymer particles with relatively even outer diameters by this method.

For example, Patent Document 1 discloses a method for producing polymer particles having single inner holes. The method includes the steps of dispersing polymerizable monomer components including a crosslinkable monomer, a hydrophilic monomer, and other monomers in an aqueous dispersion medium in the presence of different polymer particles with a different composition from that of a copolymer of these polymerizable monomer components to make the different polymer particles absorb the polymerizable monomer components and then polymerizing the polymerizable monomer components. In Patent Document 1, polystyrene, and copolymers of styrene with at least one kind selected from acrylic acid, methacrylic acid, acrylic esters, methacrylic esters, and butadiene are exemplified as the above-mentioned different polymer. Further, divinylbenzene, ethylene glycol dimethacrylate, trimethylolpropane triacrylate, and the like are exemplified as the above-mentioned crosslinkable monomer. Acrylic acid, methacrylic acid, methyl methacrylate, 2-hydroxyethyl methacrylate, vinylpyridine, glycidyl acrylate, glycidyl methacrylate, and the like are exemplified as the above-mentioned hydrophilic monomer. Styrene and the like are exemplified as other monomers. However, it is difficult to obtain hollow polymer particles with sufficiently even outer diameters and inner diameters by the method disclosed in Parent Document 1. In the examples of Patent Document 1, although hollow polymer particles with single holes are generally obtained, both of the outer diameter and the inner diameter are not even, and not only particles with a single hole structure but also particles having a plurality of holes are present in the particles.

Patent Document 2 discloses a method for producing hollow polymer particles having a single inner hole with an average inner hole diameter 0.25 to 0.8 times that of the particles. The method includes emulsion polymerization of monomer components (B) including an ionic monomer (B-a), a nonionic monomer (B-b) with a solubility parameter decreasing along with the change from the monomer to a polymer at the time of polymerization, and a nonionic monomer (B-c) other than the nonionic monomer (B-b) in an aqueous medium at a polymerization temperature satisfying a certain condition with the use of a water-soluble polymerization initiator. The emulsion polymerization is carried out in the presence of polymer particles (A) obtained by polymerization of monomers including an ionic monomer (A-a), a nonionic monomer (A-b) with a solubility parameter which does not change or increases along with the change from the monomer to a polymer at the time of polymerization, and a nonionic monomer (A-c) other than the nonionic monomer (A-b). Further, in the production method disclosed in Patent Document 2, among the combinations of the polymer particles (A) and the monomer components (B), there is a characteristic that the absolute value of the difference between the solubility parameter [δ(A-b),p] of the polymer obtained by polymerization of the nonionic monomer (A-b) component and the solubility parameter [δ(B-b),m] of the nonionic monomer (B-b) component is 1.0 or lower. However, it is impossible to obtain hollow polymer particles with sufficiently even outer and inner diameters by the method disclosed in Patent Document 2. Moreover, since a water-soluble polymerization initiator is used, the production method disclosed in Patent Document 2 has a problem that not only the polymerization ratio is lowered since the content of the polymerization initiator in the monomer oil droplets is low but also emulsion polymerization is caused simultaneously in the aqueous phase so that particles with no inner hole are mixed together.

Patent Document 3 discloses a method for producing particles having an oily substance as inner nuclei by injecting an evenly mixed solution A containing a hydrophilic monomer, a crosslinkable monomer, another monomer, and the oily substance into a liquid B which is immiscible with the solution A through a micro-porous membrane to obtain oil droplets and thereafter carrying out polymerization. However, the method of passing the mixed solution through a micro-porous membrane has a problem that ultimately, operation such as classification has to be carried out, although the method makes the distribution of the outer diameter even as compared with other conventional methods using emulsification devices.

PRIOR ART DOCUMENTS

Patent Documents

Patent Document 1: Japanese Kokoku Patent Publication Hei-04-068324 (JP-B H04-068324)
Patent Document 2: Japanese Kokai Publication Hei-04-279637 (JP-A H04-279637)
Patent Document 3: Japanese Kokai Publication 2002-105104 (JP-A 2002-105104)

SUMMARY OF THE INVENTION

Problems to be Solved by the Invention

The present invention aims to provide a method for producing single-hole hollow polymer particles having extremely uniform outer diameters and inner diameters with no need for classification operation. Further, the present invention aims to provide single-hole hollow polymer particles produced by the method for producing single-hole hollow polymer particles.

Means for Solving the Problems

The present invention provides a method for producing single-hole hollow polymer particles including the steps of preparing a dispersion of swollen particle droplets by mixing a seed particle dispersion obtained by dispersing seed particles containing a non-crosslinked polymer in a water-containing dispersion medium with an oil-soluble solvent and thereby making the seed particles absorb the oil-soluble solvent; preparing a mixed solution by mixing the dispersion of the swollen particle droplets with an aqueous solution containing a water-soluble polymer; and precipitating the water-soluble polymer on the surfaces of the swollen particle droplets by carrying out operation for lowering the solubility of the water-soluble polymer in the mixed solution.

Hereinafter, the present invention will be described in more detail.

A method for producing single-hole hollow polymer particles of the present invention includes a step of preparing a dispersion of swollen particle droplets by mixing a seed particle dispersion obtained by dispersing seed particles containing a non-crosslinked polymer in a water-containing dispersion medium with an oil-soluble solvent and thereby making the seed particles absorb the oil-soluble solvent. Additionally, the method for producing single-hole hollow polymer particles of the present invention may include a step of preparing a seed particle dispersion obtained by dispersing seed particles containing a non-crosslinked polymer in a water-containing dispersion medium.

The above-mentioned seed particles contain a non-crosslinked polymer.

A non-crosslinkable monomer composing the above-mentioned non-crosslinked polymer is not particularly limited. Examples thereof include styrene, methyl methacrylate, n-butyl methacrylate, isobutyl methacrylate, methacrylic acid, methyl acrylate, n-butyl acrylate, isobutyl acrylate, acrylic acid, and the like.

At the time of composing the seed particles by polymerizing the non-crosslinkable monomer, a small amount of a crosslinkable monomer may be used in combination. Combination use of a small amount of a crosslinkable monomer improves the strength of the seed particles to be obtained.

The crosslinkable monomer is not particularly limited. Examples thereof include divinylbenzene, ethylene glycol dimethacrylate, and the like.

In the case of mixing the crosslinkable monomer, the upper limit of the mixing amount of the crosslinkable monomer in the total of the non-crosslinkable monomer and the crosslinkable monomer is preferably 5% by weight. If the mixing amount of the crosslinkable monomer exceeds 5% by weight, the absorption property of the seed particles to be obtained for the oil-soluble solvent may be sometimes deteriorated and the swollen particle droplets may not be formed. The upper limit of the mixing amount of the crosslinkable monomer is more preferably 1% by weight.

The molecular weight of the seed particles is not particularly limited; however, a preferable upper limit of the weight average molecular weight is 500000. If the weight average molecular weight of the seed particles exceeds 500000, the absorption property of the seed particles to be obtained for the oil-soluble solvent may possibly be deteriorated and the swollen particle droplets may not be formed. The upper limit of the weight average molecular weight of the seed particles is more preferably 100000. The lower limit of the weight average molecular weight of the seed particles is not particularly limited; however, if it is less than 1000, particles may not be substantially formed.

The volume average particle diameter of the seed particles is not particularly limited; however, a preferable lower limit thereof is 1/10 of the average outer diameter (average particle diameter) of the intended single-hole hollow polymer particles and a preferable upper limit is 1/1.05 of the average outer diameter of the intended single-hole hollow polymer particles. If the volume average particle diameter of the seed particles is smaller than 1/10 of the average outer diameter of the intended single-hole hollow polymer particles, it is required for the seed particles to absorb a much more quantity of the oil-soluble solvent beyond the limit of the absorption property in order to obtain the desired outer diameter of the single-hole hollow polymer particles. Consequently, absorption residues may possibly generate or the outer diameter of the single-hole hollow polymer particles to be obtained may not be uniform. If the volume average particle diameter of the seed particles exceeds 1/1.05 of the outer diameter of the intended single-hole hollow polymer particles, there is only room for absorbing an extremely slight amount of the oil-soluble solvent. Consequently, it may sometimes become impossible to obtain single-hole hollow polymer particles with a high degree of hollowness. The volume average particle diameter of the seed particles is more preferably 1/8 of the average outer diameter of the intended single-hole hollow polymer particles or larger, and more preferably 1/1.5 of the average outer diameter of the intended single-hole hollow polymer particles or smaller.

A preferable upper limit of the Cv value of the particle diameter of the seed particles is 30%. If the Cv value of the particle diameter of the seed particles exceeds 30%, the particle diameter of the swollen seed particles may not become even and also the particle diameter of the single-hole hollow polymer particles to be obtained may not become even. The upper limit of the Cv value of the particle diameter of the seed particles is more preferably 20%.

Here, the Cv value of the particle diameter of the seed particles can be calculated according to the following formula (1) from the volume average particle diameter m measured by a particle diameter measurement apparatus and the standard deviation σ.

$$Cv = \sigma/m \times 100 (\%) \qquad (1)$$

Here, the average outer diameter of the single-hole hollow polymer particles may be calculated by observing the particles at a magnification enabling observation of about 100 particles in one visual field with a scanning electron microscope, measuring the longest diameters of arbitrarily selected 50 particles with a micrometer caliper, and calculating the number average value of the longest diameters.

The method for preparing the seed particles is not particularly limited. Examples thereof include soap-free emulsion polymerization, emulsion polymerization, dispersion polymerization, and the like.

The dispersion medium is not particularly limited as long as it is a dispersion medium containing water and may be water or a mixed dispersion medium obtained by adding a water-soluble organic solvent such as methanol or ethanol to water.

The dispersion medium may contain a dispersant as necessary.

The dispersant is not particularly limited and may be alkylsulfuric acid sulfonic acid salt, alkylbenzene sulfonate, triethanolamine alkylsulfate, polyoxyethylene alkyl ether, polyvinyl alcohol, and the like.

The mixing amount of the seed particles in the seed particle dispersion is not particularly limited and a preferable lower limit is 0.1% by weight and a preferable upper limit is 50% by weight. If the mixing amount of the seed particles is less than 0.1% by weight, the production efficiency of the single-hole hollow polymer particles may possibly become low. If the mixing amount of the seed particles exceeds 50% by weight, the seed particles may possibly be agglomerated. The lower limit of the mixing amount of the seed particles is more preferably 0.5% by weight and the upper limit is more preferably 30% by weight.

In the method for producing single-hole hollow polymer particles of the present invention, the seed particle dispersion and an oil-soluble solvent are mixed to make the seed particles absorb the oil-soluble solvent, and thus an even dispersion of swollen particle droplets is prepared.

In this specification, an oil-soluble solvent means a solvent having a logPow (octanol/water partition coefficient) of 0 or higher. The logPow of a solvent can be calculated as follows.

After a mixed liquid obtained by sufficiently mixing n-octanol and water is kept still for 24 hours, a solvent is added to the mixed liquid and the resultant is further mixed. Thereafter, the solvent concentration (Co) in the octanol phase and the solvent concentration (Cw) in the aqueous phase are measured by gas chromatography. The logPow can be calculated according to the following formula (2) from the obtained Co and Cw.

$$\mathrm{logPow} = \mathrm{log}(Co/Cw) \qquad (2)$$

Co: Solvent concentration in the octanol phase
Cw: Solvent concentration in the aqueous phase The oil-soluble solvent is not particularly limited. Examples thereof include aromatic hydrocarbons such as toluene and xylene; aliphatic hydrocarbons and cyclic hydrocarbons such as propane, cyclopropane, butane, cyclobutane, isobutane, n-pentane, cyclopentane, neopentane, isopentane, n-hexane, cyclohexane, 2-methylpentane, 2,2-dimethylbutane, n-heptane, cycloheptane, n-octane, cyclooctane, and isooctane; ketones such as methyl isobutyl ketone; esters such as ethyl acetate; and the like.

In the case of using these oil-soluble solvents, after shells of single-hole hollow polymer particles are formed as described later, the single-hole hollow polymer particles having voids may be produced by volatilizing the oil-soluble solvents, or the single-hole hollow polymer particles encapsulating the oil-soluble solvent may be produced without volatilizing the oil-soluble solvent.

Further, as described later, thermally expandable single-hole hollow polymer particles can be produced by using these oil-soluble solvents. In the case of producing the thermally expandable single-hole hollow polymer particles, volatile oil-soluble solvents of aliphatic hydrocarbons such as isopentane, heptane, and isooctane are preferably used as the oil-soluble solvent.

These oil-soluble solvents may be used alone or two or more kinds of them may be used in combination.

Furthermore, a hardener or a hardening accelerator may be used as the oil-soluble solvent.

The hardener is not particularly limited. Examples thereof include imidazole compounds such as 2-ethyl-4-methylimidazole (2E4MZ) and 2-methylimidazole (2MZ); polyamine compounds such as polyethylene polyamine and meta-xylenediamine; and acid anhydrides such as trialkyltetrahydrophthalic anhydride and trimellitic anhydride. The hardening accelerator is not particularly limited. Examples thereof include chlorine-substituted carboxylic acid compounds such as monochloroacetic acid and dichloroacetic acid; chlorine-substituted phenol compounds such as p-chlorophenol and o-chlorophenol; nitro-substituted phenol compounds such as p-nitrophenol; mercaptan compounds such as thiophenol and 2-mercaptoethanol; and the like. In the case of using these oil-soluble solvents, the single-hole hollow polymer particles encapsulating the oil-soluble solvents can be produced.

These oil-soluble solvents may be used alone or two or more kinds of them may be used in combination.

The mixing amount of the oil-soluble solvent may be adjusted properly in accordance with the outer diameter and the inner diameter of the intended single-hole hollow polymer particles. The lower limit thereof is preferably 15 parts by weight and the upper limit is preferably 100000 parts by weight relative to 100 parts by weight of the seed particles. If the mixing amount of the oil-soluble solvent is less than 15 parts by weight, single-hole hollow polymer particles having a high degree of hollowness may not be obtained. If the mixing amount of the oil-soluble solvent exceeds 100000 parts by weight, the absorption capability of the seed particles exceeds the limit and absorption residues may generate. The lower limit of the mixing amount of the oil-soluble solvent is more preferably 230 parts by weight and the upper limit is more preferably 50000 parts by weight.

The oil-soluble solvent may be added directly to the seed particle dispersion and mixed; however, it is preferable that the oil-soluble solvent is added once to a water-containing dispersion medium to prepare an emulsion and then the emulsion is added to and mixed with the seed particle dispersion. Addition in form of the emulsion to the seed particle dispersion makes it possible to make the seed particles absorb the oil-soluble solvent more evenly. In addition, the seed particle dispersion may be added to and mixed with the emulsion.

The dispersion medium for the emulsion of the oil-soluble solvent is not particularly limited and may be the same dispersion medium as that used for the seed particle dispersion or may be a different dispersion medium.

The dispersion medium for the emulsion of the oil-soluble solvent preferably contains an emulsifier. The emulsifier is not particularly limited and may be alkylsulfuric acid sulfonic acid salt, alkylbenzene sulfonate, triethanolamine alkylsulfate, polyoxyethylene alkyl ether, polyvinyl alcohol, or the like.

At the time of mixing the emulsion of the oil-soluble solvent and the seed particle dispersion, the entire amount of the emulsion may be added at once or may be added in portions and mixed. In the case of adding the emulsion in portions, dropwise addition may be employed.

When the seed particle dispersion and the oil-soluble solvent are mixed, the oil-soluble solvent is absorbed into the seed particles to form uniform swollen particle droplets.

In the method for producing single-hole hollow polymer particles of the present invention, a step of preparing a mixed solution is carried out by mixing the obtained dispersion of the swollen particle droplets with an aqueous solution containing a water-soluble polymer.

The water-soluble polymer is not particularly limited as long as it can be completely dissolved in water. Examples thereof include polyvinyl alcohol, methyl cellulose, hydroxypropylmethyl cellulose, gelatin, gelatin-polyanion complexes, sodium alginate, and the like.

The polyanion is not particularly limited. Examples thereof include gum arabic, carrageenan, carboxymethyl cellulose, agar, polyvinylbenzenesulfonic acid, and the like.

Further, in the case where polyvinyl alcohol exhibiting a gas barrier property is used as the water-soluble polymer, thermally expandable single-hole hollow polymer particles can be produced by encapsulating a volatile oil-soluble solvent such as aliphatic hydrocarbons as the oil-soluble solvent. When such thermally expandable single-hole hollow polymer particles are heated to a temperature equal to or higher than the softening point of the shells to vaporize the oil-soluble solvent, the single-hole hollow polymer particles are thermally expanded and become particles with a higher degree of hollowness.

The mixing amount of the water-soluble polymer is not particularly limited and the lower limit is preferably 0.1 parts by weight and the upper limit is preferably 100 parts by weight relative to 100 parts by weight of the oil-soluble solvent. If the mixing amount of the water-soluble polymer is less than 0.1 parts by weight, single-hole hollow polymer particles may not be obtained since the films to be formed become thin. If the mixing amount of the water-soluble polymer exceeds 100 parts by weight, the viscosity of the mixed solution may possibly increase and the handling property may deteriorate. The lower limit of the mixing amount of the water-soluble polymer is more preferably 1.0 part by weight and the upper limit is more preferably 30 parts by weight.

In the method for producing the single-hole hollow polymer particles of the present invention, operation for lowering the solubility of the water-soluble polymer in the mixed solution is carried out. The operation for lowering the solubility of the water-soluble polymer may be, for example, temperature adjustment, pH adjustment, addition of an electrolyte, addition of a poor solvent, addition of a hardener, or the like.

For example, in the case where the water-soluble polymer is polyvinyl alcohol, addition of borax, formalin-hydrochloric acid, or the like can considerably lower the solubility of the polymer in the mixed solution.

In the case where the water-soluble polymer is sodium alginate or gelatin, addition of calcium chloride, an acid, a polymer cation, or the like can considerably lower the solubility of the polymer in the mixed solution.

In the case where the water-soluble polymer is methyl cellulose, the solubility of the polymer in the mixed solution can be considerably lowered by promoting gelation by heating and hardening by adding tannic acid.

The water-soluble polymer is precipitated on the surfaces of the swollen particle droplets and films are formed by carrying out the operation for lowering the solubility of the water-soluble polymer to the mixed solution. That is, a dispersion of core-shell particles each composed of a core of the oil-soluble solvent and a shell formed by precipitation of the water-soluble polymer can be obtained.

In addition, to improve the strength of the films of the precipitated water-soluble polymer, a crosslinking agent or the like may be further added to the mixed solution.

In the method for producing single-hole hollow polymer particles of the present invention, the single-hole hollow polymer particles having voids may be produced by repeatedly washing the obtained core-shell particles with pure water and volatilizing the oil-soluble solvent, or the single-hole hollow polymer particles encapsulating the oil-soluble solvent may be produced without volatilizing the oil-soluble solvent.

According to the method for producing single-hole hollow polymer particles of the present invention, single-hole hollow polymer particles with extremely uniform outer diameters and inner diameters can be produced. Since the outer diameters and the inner diameters are extremely uniform, no special classification operation by sieves, air classification, gravitational classification or the like is needed. Since the yield is high and the processes are short, single-hole hollow polymer particles can be supplied economically and quickly.

The present invention also includes single-hole hollow polymer particles produced by the method for producing single-hole hollow polymer particles of the present invention.

The single-hole hollow polymer particles of the present invention may have voids or may encapsulate the oil-soluble solvent.

In the case of having voids, since the single-hole hollow polymer particles of the present invention have extremely uniform outer diameters and inner diameters, the single-hole hollow polymer particles can improve the specific surface area by addition in even a very small amount and can control the light diffusion, lightweight property, heat insulation property, cushion property, and selective absorption, reflection, and transmission of ultraviolet rays and visible and infrared rays.

In the case where the single-hole hollow polymer particles of the present invention encapsulate a hardener or a hardening accelerator as the oil-soluble solvent, the single-hole hollow polymer particles may be used as microcapsules encapsulating the hardener or the hardening accelerator for producing a hardened product of an epoxy resin or the like. That is, the hardened product can be produced by adding the single-hole hollow polymer particles of the present invention encapsulating the hardener or the hardening accelerator to a hardening composition, and breaking shells by mechanical pressure or heat as necessary to start a hardening reaction. The single-hole hollow polymer particles of the present invention have extremely uniform outer diameters and inner diameters. Therefore, in the hardening composition containing the single-hole hollow polymer particles of the present invention, neither hardening starts in thin portions of the shells during storage nor reactivity lowers due to insufficient bleeding of the hardener or the hardening accelerator in thick portions of the shells during hardening and as a result, the storage stability is high and the hardening occurs evenly.

In the case where the single-hole hollow polymer particles of the present invention have shells made of polyvinyl alcohol exhibiting the gas barrier property and encapsulate a volatile oil-soluble solvent such as the above-mentioned aliphatic hydrocarbons as the oil-soluble solvent, the single-hole hollow polymer particles can be used as thermally expandable single-hole hollow polymer particles. When such thermally expandable single-hole hollow polymer particles are heated to a temperature equal to or higher than the softening point of the shells to vaporize the oil-soluble solvent, the single-hole hollow polymer particles are thermally expanded and become particles with a higher degree of hollowness. The single-hole hollow polymer particles of the present invention have extremely uniform outer diameters and inner diameters. Therefore, the particles also have extremely uniform outer diameters and inner diameters after thermal expansion and in the case of using the single-hole hollow polymer particles for various applications in order to provide the light diffusion, lightweight property, heat insulation property, cushion property, and selective absorption, reflection, and transmission of ultraviolet rays and visible and infrared rays, control of these properties and capabilities is made easy.

The average outer diameter (average particle diameter) of the single-hole hollow polymer particles of the present invention is not particularly limited; however, a preferable lower limit is 0.1 µm and a preferable upper limit is 100 µm. If the average outer diameter is smaller than 0.1 µm, it is sometimes impossible to obtain sufficiently large single holes or the amount of the oil-soluble solvent to be encapsulated may possibly become small. If the average outer diameter exceeds 100 µm, the absorption of the oil-soluble solvent into the seed particles is slow and therefore, the productivity may possibly deteriorate. The lower limit of the average outer diameter of the single-hole hollow polymer particles of the present invention is more preferably 0.5 µm and the upper limit is more preferably 20 µm.

With respect to the single-hole hollow polymer particles of the present invention, a preferable upper limit of the Cv value of the outer diameter (particle diameter) is 10%. If the Cv value of the outer diameter exceeds 10%, in the case where the single-hole hollow polymer particles of the present invention are used as, for example, microcapsules encapsulating a hardener or a hardening accelerator for producing a hardened product of an epoxy resin or the like, hardening of the hardened product may sometimes not become uniform. If the Cv value of the outer diameter exceeds 10%, in the case where the single-hole hollow polymer particles of the present invention are thermally expandable, the evenness of the outer diameter of the particles after the thermal expansion may also be lowered. The upper limit of the Cv value of the outer diameter is more preferably 7%.

The Cv value of the outer diameter of the single-hole hollow polymer particles of the present invention can be calculated similarly to the Cv value of the particle diameter of the seed particles.

The average inner diameter of the single-hole hollow polymer particles of the present invention is not particularly limited; however, a preferable lower limit is 5% of the average outer diameter and a preferable upper limit is 99.9% of the average outer diameter. If the average inner diameter is less than 5% of the average outer diameter, it is sometimes impossible to obtain sufficiently large single holes or the amount of the oil-soluble solvent to be encapsulated may possibly become small. If the average inner diameter exceeds 99.9% of the average outer diameter, since the shells become thin, the oil-soluble solvent to be encapsulated may possibly leak out. The lower limit of the average inner diameter of the single-hole hollow polymer particles of the present invention is more preferably 10% of the average outer diameter and the upper limit is more preferably 99% of the average outer diameter.

With respect to the single-hole hollow polymer particles of the present invention, a preferable upper limit of the Cv value of the inner diameter is 10%. If the Cv value of the inner diameter exceeds 10%, in the case where the single-hole hollow polymer particles of the present invention are used as, for example, microcapsules encapsulating a hardener or a hardening accelerator for producing a hardened product of an epoxy resin or the like, hardening of the hardened product may sometimes not become uniform. If the Cv value of the inner diameter exceeds 10%, in the case where the single-hole hollow polymer particles of the present invention are thermally expandable, the evenness of the inner diameter of the particles after the thermal expansion may also be lowered. The upper limit of the Cv value of the inner diameter is more preferably 7%.

In addition, the Cv value of the inner diameter of the single-hole hollow polymer particles of the present invention can be calculated similarly to the Cv value of the particle diameter of the seed particles.

Effects of the Invention

According to the present invention, it is made possible to provide a method for producing single-hole hollow polymer particles having extremely uniform outer diameters and inner diameters with no need for classification operation. Further, according to the present invention, it is made possible to provide single-hole hollow polymer particles produced by the method for producing single-hole hollow polymer particles.

MODE FOR CARRYING OUT THE INVENTION

Hereinafter, embodiments of the present invention will be described in more detail with reference to the examples; however, it is not intended that the present invention be limited to the illustrated examples.

Example 1

A seed particle dispersion containing spherical non-crosslinked polystyrene particles having a volume average particle diameter of 0.5 µm and a Cv value of 15% and dispersed in a concentration of 1.5% by weight in water was prepared by mixing 100 parts by weight of styrene, 3 parts by weight of potassium persulfate, 25 parts by weight of n-octylmercaptan, and 2500 parts by weight of water and causing a reaction at 70° C. for 24 hours with stirring.

An emulsion was prepared by adding 2 parts by weight of triethanolamine laurylsulfate as an emulsifier and 900 parts by weight of water to 100 parts by weight of heptane as an oil-soluble solvent and emulsifying the mixture.

A dispersion of swollen particle droplets of seed particles having absorbed the oil-soluble solvent was obtained by adding the emulsion in an amount proper to adjust the oil-soluble solvent amount 200 times the polystyrene particle weight to the obtained seed particle dispersion and stirring the mixture for 24 hours.

While the obtained dispersion of the swollen particle droplets being stirred, an aqueous solution of hydroxypropylmethyl cellulose as a water-soluble polymer was dropwise added in a proper amount to adjust the addition amount of hydroxypropylmethyl cellulose to be 5 parts by weight to 100 parts by weight of the oil-soluble solvent to prepare a mixed solution.

After the obtained mixed solution was heated to 80° C., an aqueous tannic acid solution was dropwise added in a proper amount to adjust the addition amount of tannic acid to be 0.5 parts by weight to 100 parts by weight of the oil-soluble solvent and a reaction was carried out for 5 hours to obtain a dispersion of core-shell particles each composed of a core of heptane and a shell made of a hydroxypropylmethyl cellulose crosslinked material.

The obtained core-shell particles were repeatedly washed with pure water and vacuum-dried to volatilize heptane and thus polymer particles were obtained.

Example 2

A seed particle dispersion containing spherical non-crosslinked polystyrene particles having a volume average particle diameter of 0.5 μm and a Cv value of 15% and dispersed in a concentration of 1.5% by weight in water was prepared by mixing 100 parts by weight of styrene, 3 parts by weight of potassium persulfate, 25 parts by weight of n-octylmercaptan, and 2500 parts by weight of water and causing a reaction at 70° C. for 24 hours with stirring.

An emulsion was prepared by adding 2 parts by weight of triethanolamine laurylsulfate as an emulsifier and 900 parts by weight of water to 100 parts by weight of heptane as an oil-soluble solvent and emulsifying the mixture.

A dispersion of swollen particle droplets of seed particles having absorbed the oil-soluble solvent was obtained by adding the emulsion in an amount proper to adjust the oil-soluble solvent amount 200 times the polystyrene particle weight to the obtained seed particle dispersion and stirring the mixture for 24 hours.

While the obtained dispersion of the swollen particle droplets being stirred, an aqueous solution of gelatin as a water-soluble polymer was dropwise added in a proper amount to adjust the addition amount of gelatin to be 5 parts by weight to 100 parts by weight of the oil-soluble solvent to prepare a mixed solution.

After the obtained mixed solution was heated to 80° C., an aqueous sodium alginate solution was dropwise added in a proper amount to adjust the addition amount of sodium alginate to be 0.5 parts by weight to 100 parts by weight of the oil-soluble solvent and a reaction was carried out for 5 hours to obtain a dispersion of core-shell particles each composed of a core of heptane and a shell made of a crosslinked gelatin material.

The obtained core-shell particles were repeatedly washed with pure water and vacuum-dried to volatilize heptane and thus polymer particles were obtained.

Example 3

A seed particle dispersion containing spherical non-crosslinked polystyrene particles having a volume average particle diameter of 0.2 μm and a Cv value of 15% and dispersed in a concentration of 1.5% by weight in water was prepared in the same manner as in Example 1, except that the amount of potassium persulfate was changed to 5 parts by weight.

Polymer particles were obtained in the same manner as in Example 1, except that the emulsion was added to the seed particle dispersion with changing the amount of the emulsion so that the amount of the oil-soluble solvent be 20 times that of the polystyrene particle weight.

Example 4

A seed particle dispersion containing spherical non-crosslinked polystyrene particles having a volume average particle diameter of 2.0 μm and a Cv value of 15% and dispersed in a concentration of 1.5% by weight in water was prepared in the same manner as in Example 1, except that the amount of potassium persulfate was changed to 0.5 parts by weight.

Polymer particles were obtained in the same manner as in Example 1, except that the emulsion was added to the seed particle dispersion with changing the amount of the emulsion so that the amount of the oil-soluble solvent be 125 times that of the polystyrene particle weight.

Example 5

A seed particle dispersion containing spherical non-crosslinked polystyrene particles having a volume average particle diameter of 5.0 μm and a Cv value of 15% and dispersed in a concentration of 1.5% by weight in water was prepared in the same manner as in Example 1, except that the amount of potassium persulfate was changed to 0.5 parts by weight and 0.1 parts by weight of sodium chloride was further added.

Polymer particles were obtained in the same manner as in Example 1, except that the emulsion was added to the seed particle dispersion with changing the amount of the emulsion so that the amount of the oil-soluble solvent be 125 times that of the polystyrene particle weight.

COMPARATIVE EXAMPLE 1

An emulsion was prepared by passing 100 parts by weight of heptane as an oil-soluble solvent through a porous membrane and dispersing heptane in a continuous layer containing an emulsifier and water.

While the obtained emulsion being stirred, an aqueous solution of hydroxypropylmethyl cellulose as a water-soluble polymer was dropwise added in a proper amount to adjust the addition amount of hydroxypropylmethyl cellulose to be 5 parts by weight to 100 parts by weight of the oil-soluble solvent. After the mixture was heated to 80° C., an aqueous tannic acid solution was dropwise added in a proper amount to adjust the addition amount of tannic acid to be 0.5 parts by weight to 100 parts by weight of the oil-soluble solvent and a reaction was carried out for 5 hours to obtain a dispersion of core-shell particles each composed of a core of heptane and a shell made of a hydroxypropylmethyl cellulose crosslinked material.

The obtained core-shell particles were repeatedly washed with pure water and vacuum-dried to volatilize heptane and thus polymer particles were obtained.

COMPARATIVE EXAMPLE 2

An emulsion was prepared by passing 100 parts by weight of heptane as an oil-soluble solvent through a porous membrane and dispersing heptane in a continuous layer containing an emulsifier and water.

While the obtained emulsion being stirred, an aqueous solution of gelatin as a water-soluble polymer was dropwise added in a proper amount to adjust the addition amount of gelatin to be 5 parts by weight to 100 parts by weight of the oil-soluble solvent. After the mixture was heated to 80° C., an aqueous sodium alginate solution was dropwise added in a proper amount to adjust the addition amount of sodium alginate to be 0.5 parts by weight to 100 parts by weight of the oil-soluble solvent and a reaction was carried out for 5 hours to obtain a dispersion of core-shell particles each composed of a core of heptane and a shell made of a crosslinked gelatin material.

The obtained core-shell particles were repeatedly washed with pure water and vacuum-dried to volatilize heptane and thus polymer particles were obtained.

(Evaluation)

The polymer particles obtained in Examples 1 to 5 and Comparative Examples 1 and 2 were evaluated by the following methods. The results are shown in Table 1.

(1) Measurement of Outer Diameter

The obtained polymer particles were observed at a magnification proper to observe about 100 particles in one visual field by a scanning electron microscope: the longest diameters of arbitrarily selected 50 particles were measured with a micrometer caliper: the number average value of the longest diameters and a variation coefficient were calculated and defined as the average outer diameter and the Cv value of the outer diameter, respectively.

(2) Measurement of Inner Diameter and Evaluation of Single Hole Property

After the obtained polymer particles were embedded in an epoxy resin, the resin was hardened and cross-sectional cut pieces were obtained by a microtome. The obtained cut pieces were observed at a magnification proper to observe the cross sections of about 100 particles in one visual field by a scanning electron microscope.

The single hole property was evaluated as follows: in the case where there were 49 or more particles having single holes, the case was evaluated as "⊚" (very good); in the case where there were 45 to 48 particles, the case was evaluated as "○" (good); in the case where there were 40 to 44 particles, the case was evaluated as "Δ" (acceptable); and in the case where there were 39 or less particles, the case was evaluated as "×" (poor) by observing the cross sections of arbitrarily selected 50 particles.

Further, the longest diameters of single holes in cross sections of arbitrarily selected 50 particles were measured with a micrometer caliper and the number average value of the longest diameters and a variation coefficient were calculated and defined as the average inner diameter and the Cv value of the inner diameter, respectively. In addition, the average inner diameter and the Cv value of the inner diameter were calculated for the particles having single holes.

tylmercaptan, and 2500 parts by weight of water and causing a reaction at 70° C. for 24 hours with stirring.

An emulsion was prepared by adding 2 parts by weight of triethanolamine laurylsulfate as an emulsifier and 900 parts by weight of water to a mixed solution as an oil-soluble solvent obtained by evenly dissolving 100 parts by weight of 2-ethyl-4-methylimidazole (2E4MZ) and 100 parts by weight of toluene.

A dispersion of swollen particle droplets of seed particles having absorbed the oil-soluble solvent was obtained by adding the emulsion in an amount proper to adjust the oil-soluble solvent amount 200 times the polystyrene particle weight to the obtained seed particle dispersion and stirring the mixture for 24 hours.

While the obtained dispersion of the swollen particle droplets being stirred, an aqueous solution of hydroxypropylmethyl cellulose as a water-soluble polymer was dropwise added in a proper amount to adjust the addition amount of hydroxypropylmethyl cellulose to be 5 parts by weight to 100 parts by weight of the oil-soluble solvent to prepare a mixed solution.

After the obtained mixed solution was heated to 80° C., an aqueous tannic acid solution was dropwise added in a proper amount to adjust the addition amount of tannic acid to be 0.5 parts by weight to 100 parts by weight of the oil-soluble solvent and a reaction was carried out for 5 hours to obtain a dispersion of core-shell particles each composed of a core of toluene/2-ethyl-4-methylimidazole and a shell made of a hydroxypropylmethyl cellulose crosslinked material.

The obtained core-shell particles were repeatedly washed with pure water and vacuum-dried to volatilize toluene and thus polymer particles were obtained.

Example 7

Polymer particles were obtained in the same manner as in Example 6, except that 100 parts by weight of 2-methylimidazole (2MZ) was used in place of 100 parts by weight of 2-ethyl-4-methylimidazole (2E4MZ) as an oil-soluble solvent.

TABLE 1

| | Use of seed particles | Water-soluble polymer | Precipitation method | Average outer diameter (μm) | Cv value of outer diameter (%) | Single hole property | Average inner diameter (μm) | Cv value of inner diameter (%) |
|---|---|---|---|---|---|---|---|---|
| Example1 | Used | Hydroxypropylmethyl cellulose | Addition of tannic acid | 3.0 | 3 | ○ | 2.8 | 5 |
| Example2 | Used | Gelatin | Addition of sodium alginate | 3.0 | 5 | ○ | 2.9 | 5 |
| Example3 | Used | Hydroxypropylmethyl cellulose | Addition of tannic acid | 0.5 | 4 | ○ | 0.4 | 6 |
| Example4 | Used | Hydroxypropylmethyl cellulose | Addition of tannic acid | 10.0 | 3 | ○ | 9.5 | 5 |
| Example5 | Used | Hydroxypropylmethyl cellulose | Addition of tannic acid | 25.0 | 6 | ○ | 24.5 | 7 |
| Comparative Example1 | Not used | Hydroxypropylmethyl cellulose | Addition of tannic acid | 3.0 | 35 | ○ | 2.9 | 52 |
| Comparative Example2 | Not used | Gelatin | Addition of sodium alginate | 3.0 | 28 | ○ | 2.8 | 47 |

Example 6

A seed particle dispersion containing spherical non-crosslinked polystyrene particles having a volume average particle diameter of 0.5 μm and a Cv value of 15% and dispersed in a concentration of 1.5% by weight in water was prepared by mixing 100 parts by weight of sytrene, 3 parts by weight of potassium persulfate, 25 parts by weight of n-oc- Example 8

A seed particle dispersion containing spherical non-crosslinked polystyrene particles having a volume average particle diameter of 0.2 μm and a Cv value of 15% and dispersed in a concentration of 1.5% by weight in water was prepared in the same manner as in Example 6, except that the amount of potassium persulfate was changed to 5 parts by weight.

Polymer particles were obtained in the same manner as in Example 6, except that the addition amount of the emulsion to the seed particle dispersion was changed to be proper to adjust the oil-soluble solvent amount 20 times the polystyrene particle weight.

Example 9

A seed particle dispersion containing spherical non-crosslinked polystyrene particles having a volume average particle diameter of 2.0 μm and a Cv value of 15% and dispersed in a concentration of 1.5% by weight in water was prepared in the same manner as in Example 6, except that the amount of potassium persulfate was changed to 0.5 parts by weight.

Polymer particles were obtained in the same manner as in Example 6, except that the addition amount of the emulsion to the seed particle dispersion was changed to be proper to adjust the oil-soluble solvent amount 125 times the polystyrene particle weight.

Example 10

A seed particle dispersion containing spherical non-crosslinked polystyrene particles having a volume average particle diameter of 5.0 μm and a Cv value of 15% and dispersed in a concentration of 1.5% by weight in water was prepared in the same manner as in Example 6, except that the amount of potassium persulfate was changed to 0.5 parts by weight and 0.1 parts by weight of sodium chloride was further added.

Polymer particles were obtained in the same manner as in Example 6, except that the addition amount of the emulsion to the seed particle dispersion was changed to be proper to adjust the oil-soluble solvent amount 125 times the polystyrene particle weight.

COMPARATIVE EXAMPLE 3

90 parts by weight of 1-cyanoethyl-2-phenylimidazole previously finely pulverized into particles having an average particle diameter of 5 μm was dispersed in 400 parts by weight of an isopropyl alcohol solution containing 2 parts by weight of methacrylic acid, 8 parts by weight of acrylonitrile, and 0.1 parts by weight of 2,2-azobis(4-methoxy-2,4-dimethylvaleronitrile). The dispersion was reacted at 50° C. for 3 hours in nitrogen atmosphere to obtain a dispersion of core-shell particles each composed of a core of 1-cyanoethyl-2-phenylimidazole and a shell made of a methacrylic acid/acrylonitrile copolymer. Thereafter, the obtained dispersion was filtered to obtain polymer particles.

COMPARATIVE EXAMPLE 4

A three-neck round flask with a capacity of 1000 mL and equipped with a thermometer, a reflux condenser, and a half-moon stirrer made of Teflon (registered trademark) was loaded with 28.0 g of 2-methylimidazole (2MZ) and 4.99 g of an acrylic polymer (Reseda GP 300, manufactured by Toagosei Co., Ltd.); next, 593.95 g of methyl isobutyl ketone (MIBK) was added; and the temperature was increased to 70° C. for complete dissolution. Next, 143.74 g of an MIBK solution containing 50% by weight of a bisphenol A type epoxy resin (Epikote 828, manufactured by Japan Epoxy Resin Co., Ltd.) was added and mixed and the mixture was reacted at 70° C. for 10 hours while being stirred at a speed of 300 rpm until the reaction ratio reached almost 100% to obtain a dispersion of core-shell particles each composed of a core of 2-methylimidazole (2MZ) and a shell of the acrylic polymer. Thereafter, the obtained dispersion was filtered to obtain polymer particles.

COMPARATIVE EXAMPLE 5

An emulsion was prepared by adding 2 parts by weight of triethanolamine laurylsulfate as an emulsifier and 900 parts by weight of water to a mixed solution as an oil-soluble solvent obtained by evenly dissolving 100 parts by weight of 2-ethyl-4-methylimidazole (2E4MZ) and 100 parts by weight of toluene.

Polymer particles were obtained in the same manner as in Example 6, except that the obtained emulsion was added to water (no seed particle was used).

(Evaluation)

The polymer particles obtained in Examples 6 to 10 and Comparative Examples 3 to 5 were evaluated by the following methods. The results are shown in Table 2.

(1) Measurement of Outer Diameter

The obtained polymer particles were observed at a magnification proper to observe about 100 particles in one visual field by a scanning electron microscope: the longest diameters of arbitrarily selected 50 particles were measured with a micrometer caliper: the number average value of the longest diameters and a variation coefficient were calculated and defined as the average outer diameter and the Cv value of the outer diameter, respectively.

(2) Measurement of Inner Diameter and Evaluation of Single Hole Property

After the obtained polymer particles were embedded in an epoxy resin, the resin was hardened and cross-sectional cut pieces were obtained by a microtome. The obtained cut pieces were observed at a magnification proper to observe the cross sections of about 100 particles in one visual field by a scanning electron microscope.

The single hole property was evaluated as follows: in the case where there were 49 or more particles having single holes, the case was evaluated as "⊙" (very good); in the case where there were 45 to 48 particles, the case was evaluated as "○" (good); in the case where there were 40 to 44 particles, the case was evaluated as "Δ" (acceptable); and in the case where there were 39 or less particles, the case was evaluated as "×" (poor) by observing the cross sections of arbitrarily selected 50 particles.

Further, the longest diameters of single holes in cross sections of arbitrarily selected 50 particles were measured with a micrometer caliper and the number average value and a variation coefficient of the measured values were calculated and defined as the average inner diameter and the Cv value of the inner diameter, respectively. In addition, the average inner diameter and the Cv value of the inner diameter were calculated for the particles having single holes.

(3) Evaluation of Storage Stability

Mixtures containing each 10 parts by weight of the obtained polymer particles and 100 parts by weight of an epoxy resin (JER 828, manufactured by Japan Epoxy Resin Co., Ltd.) were left still at 40° C. for 7 days. After being left still, mixtures which were not gelled were evaluated as "○" (good) and mixtures which were gelled were evaluated as "×" (poor).

TABLE 2

| | Use of seed particles | Dispersion medium | Core component | Average outer diameter (μm) | Cv value of outer diameter (%) | Single hole property | Average inner diameter (μm) | Cv value of inner diameter (%) | Storage stability |
|---|---|---|---|---|---|---|---|---|---|
| Example6 | Used | Water | 2E4MZ | 3.0 | 3 | ○ | 2.8 | 5 | ○ |
| Example7 | Used | Water | 2MZ | 3.0 | 5 | ○ | 2.9 | 5 | ○ |
| Example8 | Used | Water | 2E4MZ | 0.5 | 4 | ○ | 0.4 | 6 | ○ |
| Example9 | Used | Water | 2E4MZ | 10.0 | 3 | ○ | 9.5 | 45 | ○ |
| Example10 | Used | Water | 2E4MZ | 25.0 | 6 | ○ | 24.5 | 7 | ○ |
| Comparative Example3 | Not used | Isopropyl alcohol | 1-Cyanoethyl-2-phenylimidazole | 5.0 | 52 | ○ | 4.7 | 75 | X |
| Comparative Example4 | Not used | MIBK | 2MZ | 2.8 | 30 | ○ | 2.4 | 29 | X |
| Comparative Example5 | Not used | Water | 2E4MZ | 12 | 40 | Δ | 11 | 55 | X |

2E4MZ (2-ethyl-4-methylimidazole),
2MZ (2-methylimidazole),
MIBK (methyl isobutyl ketone)

Example 11

A seed particle dispersion containing spherical non-crosslinked polystyrene particles having a volume average particle diameter of 0.5 μm and a Cv value of 15% and dispersed in a concentration of 1.5% by weight in water was prepared by mixing 100 parts by weight of sytrene, 3 parts by weight of potassium persulfate, 25 parts by weight of n-octylmercaptan, and 2500 parts by weight of water and causing a reaction at 70° C. for 24 hours with stirring.

An emulsion was prepared by adding 2 parts by weight of triethanolamine laurylsulfate as an emulsifier and 900 parts by weight of water to 100 parts by weight of heptane as an oil-soluble solvent and emulsifying the mixture.

A dispersion of swollen particle droplets of seed particles having absorbed the oil-soluble solvent was obtained by adding the emulsion in an amount proper to adjust the oil-soluble solvent amount 200 times the polystyrene particle weight to the obtained seed particle dispersion and stirring the mixture for 24 hours.

While the obtained dispersion of the swollen particle droplets being stirred, an aqueous solution of polyvinyl alcohol as a water-soluble polymer was dropwise added in a proper amount to adjust the addition amount of polyvinyl alcohol to be 5 parts by weight to 100 parts by weight of the oil-soluble solvent to prepare a mixed solution.

After the obtained mixed solution was heated to 80° C., an aqueous 1% formalin solution was dropwise added in a proper amount to adjust the addition amount of formalin to be 0.5 parts by weight to 100 parts by weight of the oil-soluble solvent and 10 parts by weight of 1 N hydrochloric acid was added and then, a reaction was carried out for 5 hours to obtain a dispersion of core-shell particles each composed of a core of heptane and a shell made of polyvinyl alcohol.

The obtained core-shell particles were repeatedly washed with pure water and vacuum-dried to obtain polymer particles.

Example 12

A seed particle dispersion containing spherical non-crosslinked polystyrene particles having a volume average particle diameter of 2.0 μm and a Cv value of 15% and dispersed in a concentration of 1.5% by weight in water was prepared in the same manner as in Example 11, except that the amount of potassium persulfate was changed to 0.5 parts by weight.

Polymer particles were obtained in the same manner as in Example 11, except that the addition amount of the emulsion to the seed particle dispersion was changed to be proper to adjust the oil-soluble solvent amount 125 times the polystyrene particle weight.

Example 13

A seed particle dispersion containing spherical non-crosslinked polystyrene particles having a volume average particle diameter of 5.0 μm and a Cv value of 15% and dispersed in a concentration of 1.5% by weight in water was prepared in the same manner as in Example 11, except that the amount of potassium persulfate was changed to 0.5 parts by weight and 0.1 parts by weight of sodium chloride was further added.

Polymer particles were obtained in the same manner as in Example 11, except that the addition amount of the emulsion to the seed particle dispersion was changed to be proper to adjust the oil-soluble solvent amount 125 times the polystyrene particle weight.

COMPARATIVE EXAMPLE 6

An emulsion was prepared by passing 100 parts by weight of heptane as an oil-soluble solvent through a porous membrane and dispersing heptane in a continuous layer containing an emulsifier and water.

While the obtained emulsion being stirred, an aqueous solution of polyvinyl alcohol as a water-soluble polymer was dropwise added in a proper amount to adjust the addition amount of polyvinyl alcohol to be 5 parts by weight to 100 parts by weight of the oil-soluble solvent. After the mixture was heated to 80° C., an aqueous 1% formalin solution was dropwise added in a proper amount to adjust the addition amount of formalin to be 0.5 parts by weight to 100 parts by weight of the oil-soluble solvent and 10 parts by weight of 1 N hydrochloric acid was added and then, a reaction was carried out for 5 hours to obtain a dispersion of core-shell particles each composed of a core of heptane and a shell made of polyvinyl alcohol.

The obtained core-shell particles were repeatedly washed with pure water and vacuum-dried to obtain polymer particles.

(Evaluation)

The polymer particles obtained in Examples 11 to 13 and Comparative Example 6 were evaluated by the following methods. The results are shown in Table 3.

(1) Measurement of Outer Diameter

The obtained polymer particles were observed at a magnification proper to observe about 100 particles in one visual field by a scanning electron microscope: the longest diameters of arbitrarily selected 50 particles were measured with a micrometer caliper: the number average value of the longest diameters and a variation coefficient were calculated and defined as the average outer diameter and the Cv value of the outer diameter, respectively.

(2) Measurement of Inner Diameter and Evaluation of Single Hole Property

After the obtained polymer particles were embedded in an epoxy resin, the resin was hardened and cross-sectional cut pieces were obtained by a microtome. The obtained cut pieces were observed at a magnification proper to observe the cross sections of about 100 particles in one visual field by a scanning electron microscope.

The single hole property was evaluated as follows: in the case where there were 49 or more particles having single holes, the case was evaluated as "⊚" (very good); in the case where there were 45 to 48 particles, the case was evaluated as "○" (good); in the case where there were 40 to 44 particles, the case was evaluated as "Δ" (acceptable); and in the case where there were 39 or less particles, the case was evaluated as "×" (poor) by observing the cross sections of arbitrarily selected 50 particles.

Further, the longest diameters of single holes in cross sections of arbitrarily selected 50 particles were measured with a micrometer caliper and the number average value of the longest diameters and a variation coefficient were calculated and defined as the average inner diameter and the Cv value of the inner diameter, respectively. In addition, the average inner diameter and the Cv value of the inner diameter were calculated for the particles having single holes.

(3) Evaluation of Thermal Expandability (Foamability)

About 0.1 g of each of the obtained polymer particles were put in a 10 mL measuring cylinder. Thereafter, the cylinder was put in an oven heated to 150° C. for 5 minutes and the volume of the thermally expandable polymer particles expanded in the cylinder was measured. In the case where the volume was 5 mL or more, the case was evaluated as "⊚" (very good); in the case where the volume was 2 mL or more and less than 5 mL, the case was evaluated as "○" (good); in the case where the volume was 0.5 mL or more and less than 2 mL, the case was evaluated as "Δ" (acceptable); and in the case where the volume was less than 0.5 mL, the case was evaluated as "×" (poor).

TABLE 3

| | Use of seed particles | Dispersion medium | Core component | Average outer diameter (μm) | Cv value of outer diameter (%) | Single hole property | Average inner diameter (μm) | Cv value of inner diameter (%) | Thermal expandability (foamability) |
|---|---|---|---|---|---|---|---|---|---|
| Example11 | Used | Water | Heptane | 2.9 | 4 | ○ | 2.5 | 6 | ○ |
| Example12 | Used | Water | Heptane | 11.5 | 5 | ○ | 10.0 | 7 | ○ |
| Example13 | Used | Water | Heptane | 24.4 | 5 | ○ | 23.6 | 5 | ⊚ |
| Comparative Example6 | Not used | Water | Heptane | 4.2 | 24 | ○ | 3.5 | 33 | Δ |

INDUSTRIAL APPLICABILITY

According to the present invention, it is made possible to provide a method for producing single-hole hollow polymer particles having extremely uniform outer diameters and inner diameters with no need for classification operation. Further, according to the present invention, it is made possible to provide single-hole hollow polymer particles produced by the method for producing single-hole hollow polymer particles.

The invention claimed is:

1. A method for producing single-hole hollow polymer particles which comprises the steps of:
    preparing a dispersion of swollen particle droplets by mixing a seed particle dispersion obtained by dispersing seed particles containing a non-crosslinked polymer in a water-containing dispersion medium with an oil-soluble solvent and thereby making said seed particles absorb said oil-soluble solvent;
    preparing a mixed solution by mixing said dispersion of the swollen particle droplets with an aqueous solution containing a water-soluble polymer; and
    precipitating said water-soluble polymer on the surfaces of said swollen particle droplets by carrying out an operation for lowering the solubility of said water-soluble polymer in said mixed solution.

2. The method for producing single-hole hollow polymer particles according to claim 1,
    wherein an emulsion obtained by dispersing the oil-soluble solvent in a water-containing dispersion medium and the seed particle dispersion are mixed.

3. The method for producing single-hole hollow polymer particles according to claim 1,
    wherein the Cv value of the particle diameter of the seed particles is 30% or lower.

4. The method for producing single-hole hollow polymer particles according to claim 1,
    wherein the oil-soluble solvent is a hardener or a hardening accelerator.

5. The method for producing single-hole hollow polymer particles according to claim 1,
    wherein the water-soluble polymer is polyvinyl alcohol.

* * * * *